(12) United States Patent
Lorenz

(10) Patent No.: US 11,814,156 B2
(45) Date of Patent: Nov. 14, 2023

(54) ACTUATION UNIT FOR ACTUATING A FOLDABLE WING TIP PORTION OF A WING FOR AN AIRCRAFT

(71) Applicant: AIRBUS OPERATIONS GMBH, Hamburg (DE)

(72) Inventor: Christian Lorenz, Hamburg (DE)

(73) Assignee: AIRBUS OPERATIONS GmbH, Hamburg (DE)

( * ) Notice: Subject to any disclaimer, the term of this patent is extended or adjusted under 35 U.S.C. 154(b) by 113 days.

(21) Appl. No.: 17/427,359

(22) PCT Filed: Jun. 19, 2020

(86) PCT No.: PCT/EP2020/067073
§ 371 (c)(1),
(2) Date: Jul. 30, 2021

(87) PCT Pub. No.: WO2020/254560
PCT Pub. Date: Dec. 24, 2020

(65) Prior Publication Data
US 2022/0126983 A1    Apr. 28, 2022

(30) Foreign Application Priority Data
Jun. 21, 2019    (DE) ..................... 10 2019 116 857.0

(51) Int. Cl.
*B64C 13/34*    (2006.01)
*B64C 3/56*    (2006.01)
*B64C 13/50*    (2006.01)

(52) U.S. Cl.
CPC ................ *B64C 13/34* (2013.01); *B64C 3/56* (2013.01); *B64C 13/50* (2013.01)

(58) Field of Classification Search
CPC .......... B64C 13/34; B64C 3/56; B64C 13/50; B64C 3/546
See application file for complete search history.

(56) References Cited

U.S. PATENT DOCUMENTS 2,076,150 A    4/1937 Klein
4,471,928 A *  9/1984 Cole ........................ B64C 9/20
244/215

(Continued)

FOREIGN PATENT DOCUMENTS

CN    205707297    11/2016
CN    108688793    10/2018

(Continued)

OTHER PUBLICATIONS

International Search Report for PCT/EP2020/067073, dated Oct. 15, 2020, 4 pages.

(Continued)

*Primary Examiner* — Rodney A Bonnette
(74) *Attorney, Agent, or Firm* — Nixon & Vanderhye P.C.

(57) ABSTRACT

An actuation unit for actuating a foldable wing tip portion of a wing for an aircraft is disclosed including a motor configured to be mounted to a fixed wing for an aircraft, a drive pinion driven rotationally by the motor, a first rack configured to be mounted to the fixed wing, a second rack configured to be mounted to the foldable wing tip portion, a third rack configured to be mounted to the fixed wing movably along a defined first movement path and drivingly engaged by the drive pinion, and a transfer pinion mounted to the third rack rotatably about an axis of rotation extending perpendicular to the first movement path.

9 Claims, 4 Drawing Sheets

(56) References Cited

U.S. PATENT DOCUMENTS

| | | |
|---|---|---|
| 8,089,034 B2 | 1/2012 | Hammerquist |
| 2017/0073082 A1* | 3/2017 | Ungar ...................... B64C 9/22 |
| 2017/0183093 A1* | 6/2017 | Bialek .................... B64C 37/00 |
| 2019/0048961 A1 | 2/2019 | Fox et al. |
| 2019/0176963 A1 | 6/2019 | Hsueh |
| 2020/0001982 A1* | 1/2020 | Utt ........................... B64C 3/14 |

FOREIGN PATENT DOCUMENTS

| | | |
|---|---|---|
| EP | 0227643 | 7/1987 |
| EP | 2 669 191 | 12/2013 |
| EP | 3378760 | 9/2018 |
| FR | 874432 | 8/1942 |
| GB | 2555854 | 5/2018 |
| WO | 2019/034432 | 2/2019 |

OTHER PUBLICATIONS

Written Opinion of the ISA for PCT/EP2020/067073, dated Oct. 15, 2020, 6 pages.
German Search Report for DE 10 2019 116 857.0, dated Feb. 20, 2020, 8 pages.

* cited by examiner

ACTUATION UNIT FOR ACTUATING A FOLDABLE WING TIP PORTION OF A WING FOR AN AIRCRAFT

CROSS REFERENCE TO RELATED APPLICATIONS

The present application is a National Phase of International Application Number PCT/EP2020/067073, filed Jun. 19, 2020, which designated the U.S. and claims priority benefits from German Patent Application Number DE 10 2019 116 857.0, filed Jun. 21, 2019, the entire contents of each of which are hereby incorporated by reference.

BACKGROUND AND SUMMARY

The present invention relates to an actuation unit for actuating a foldable wing tip portion of a wing for an aircraft. Such a wing comprises a fixed wing and a wing tip portion mounted to the fixed wing in a foldable manner. In particular, the wing tip portion is foldable upwards about an axis extending in a horizontal plane and/or in parallel to a chord line and/or in parallel to a flight direction of an associated aircraft. Further aspects of the present invention relate to a wing comprising the actuation unit as well as to an aircraft comprising the wing.

Foldable wings are developed in order to reduce the space requirements of an aircraft during maneuver and parking on ground. As soon as the aircraft has landed the foldable wing tip portions of the wings are folded upwards, thereby reducing the overall span of the aircraft.

Actuation units for actuating movable parts of the wing, such as slats, are known in the art. Such units commonly apply a rack and pinion drive. However, little available space at the wing tips and at the same time high torque requirements for the actuation of the wing tip portion do not allow to employ an actuation unit similar to the ones for moving slats or flaps of a known wing.

Accordingly, the object of the present invention is to provide a highly compact and strong actuation unit.

This object is achieved by an actuation unit comprising a motor, a drive pinion, a first rack, a second rack, a third rack, and a transfer pinion. The motor is preferably an electric motor and/or a hydraulic motor and is configured to be fixedly mounted to a fixed wing for an aircraft, directly or indirectly e.g. via an actuation unit structure or frame. The drive pinion is driven rotationally by the motor, preferably via a gear unit. The first rack is configured to be fixedly mounted to the fixed wing, directly or indirectly e.g. via the motor or via an actuation unit structure. The second rack is configured to be fixedly mounted to the foldable wing tip portion. The third rack is configured to be mounted to the fixed wing movably along a defined first movement path, e.g. via a roller bearing, directly or indirectly e.g. via the motor or via an actuation unit structure, and is drivingly engaged by the drive pinion for being driven along the first movement path. The transfer pinion is mounted to the third rack rotatably about an axis of rotation extending perpendicular to the first movement path. The first rack engages the transfer pinion at a first side and the second rack engages the transfer pinion at an opposite second side of the circumference of the transfer pinion.

In such a way, a cascaded kinematics is formed, wherein when the motor driven drive pinion drives the third rack along the first movement path, the transfer pinion that is scrolling along the first rack drives the second rack along a second movement path with a speed twice as high as the speed of the third rack driven along the first movement path. Such a cascaded kinematics enables a highly compact, fast, strong and efficient design of the actuation unit.

According to a preferred embodiment, the first rack, the second rack and the third rack extend equally spaced from one another in a direction perpendicular to their direction of extension with the third rack arranged between the first rack and the second rack. The diameter of the transfer pinion is as great as the distance between the first and second racks. In such a way, a very efficient cascaded rack arrangement is formed.

According to another preferred embodiment, the first rack, the second rack, the third rack, the first movement path and the second movement path have a shape circularly curved about a main axis of the actuation unit. In such a way, during actuation of the actuation unit the second rack rotates along the second movement path about the main axis and the third rack rotates along first movement path about the main axis. In any case, the main axis lies outside of the first, second and third racks. In such a way, a very efficient curved cascaded rack arrangement for actuation along a curved path is formed.

According to yet another preferred embodiment, the first rack, the second rack, the third rack, the first movement path and the second movement path are formed concentrically about the main axis with the first rack having a first curvature radius, the second rack and the second movement path having a second curvature radius, and the third rack and the first movement path having a third curvature radius. Preferably, the first, second and third curvature radii each differ from one another. In such a way, a very efficient curved cascaded rack arrangement for actuation along a curved path is formed.

In particular, it is preferred that the first curvature radius is smaller than the third curvature radius and the third curvature radius is smaller than the second curvature radius. In such a way, the second rack relates to the most lateral one of the racks, so that the foldable wing tip portion can easily be mounted the second rack.

According to a preferred embodiment, an axis of rotation of the transfer pinion is parallel to an axis of rotation of the drive pinion. In such a way, a very compact design of the actuation unit is enabled. However, the axis of rotation of the transfer pinion might also extend perpendicular to the axis of rotation of the drive pinion.

A further aspect of the present invention relates to a wing for an aircraft. The wing comprises a fixed wing, a foldable wing tip portion mounted to the fixed wing via one or more hinges rotatably about a hinge axis between an extended position and a folded position, and an actuation unit according to any of afore described embodiments, for actuating the foldable wing tip portion for movement about the hinge axis. The actuation unit is attached to the fixed wing and to the foldable wing tip portion by the motor being fixedly mounted to the fixed wing, directly or indirectly e.g. via an actuation unit structure, the first rack being fixedly mounted to the fixed wing, directly or indirectly e.g. via the motor or via an actuation unit structure, the second rack being fixedly mounted to the foldable wing tip portion, and the third rack being mounted to the fixed wing, e.g. via a roller bearing, movably along the first movement path, directly or indirectly e.g. via the motor or via an actuation unit structure. The hinge axis coincides with the main axis of the actuation unit. The actuation unit is preferably positioned on the hinge axis between two neighboring hinges. Features and advantages mentioned further above in connection with the actuation unit also apply for the wing.

According to a preferred embodiment, when the foldable wing tip portion is in the extended position, the second rack extends opposite the first rack, and when the foldable wing tip portion is in the folded position, the second rack extends offset from the first rack. In such a way, a very compact design of the actuation unit is enabled.

BRIEF DESCRIPTION OF THE DRAWINGS

A yet further aspect of the present invention relates to an aircraft comprising a wing according to any of the afore-described embodiments. Features and advantages mentioned further above in connection with the actuation unit and the wing also apply for the aircraft. Hereinafter, the present invention is described in more detail by means of a drawing. The drawing shows in FIG. 1 a perspective view of an aircraft according to the invention, FIG. 2 a perspective view of a wing of the aircraft of FIG. 1, where a wing tip portion is movably mounted to a fixed wing via hinges and an actuation unit according to the invention, FIG. 3 a first perspective view of a schematic illustration of the actuation unit of the wing shown in FIG. 2 with the foldable wing tip portion in the extended position, and FIG. 4 a second perspective view of a the illustration of the actuation unit shown in FIG. 3 with the foldable wing tip portion in the folded position.

DETAILED DESCRIPTION OF SOME EMBODIMENTS

Figure 1:
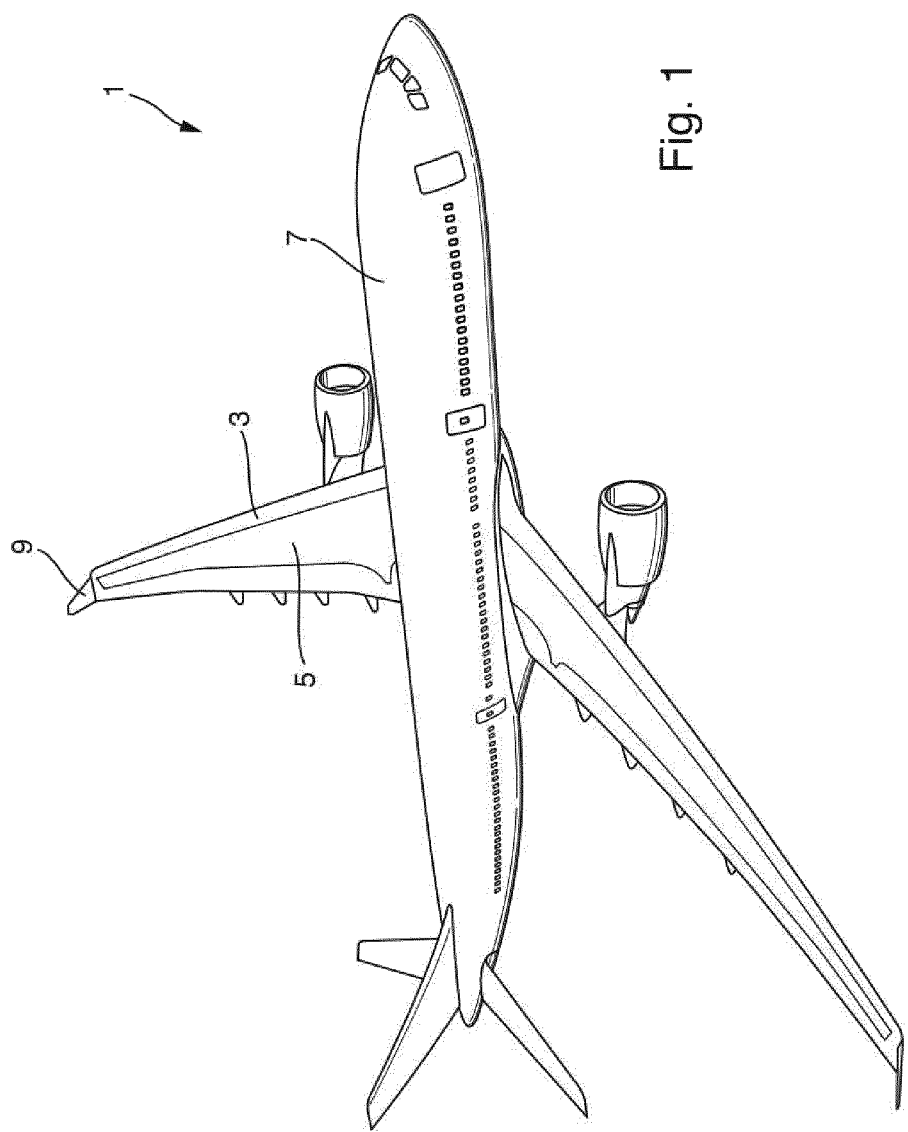

FIG. 1 shows an exemplary aircraft 1 according to an embodiment of the present invention. The aircraft 1 comprises a foldable wing 3 including a fixed wing 5 mounted to a fuselage 7, and a foldable wing tip portion 9 movably mounted to the fixed wing 5.

Figure 2:
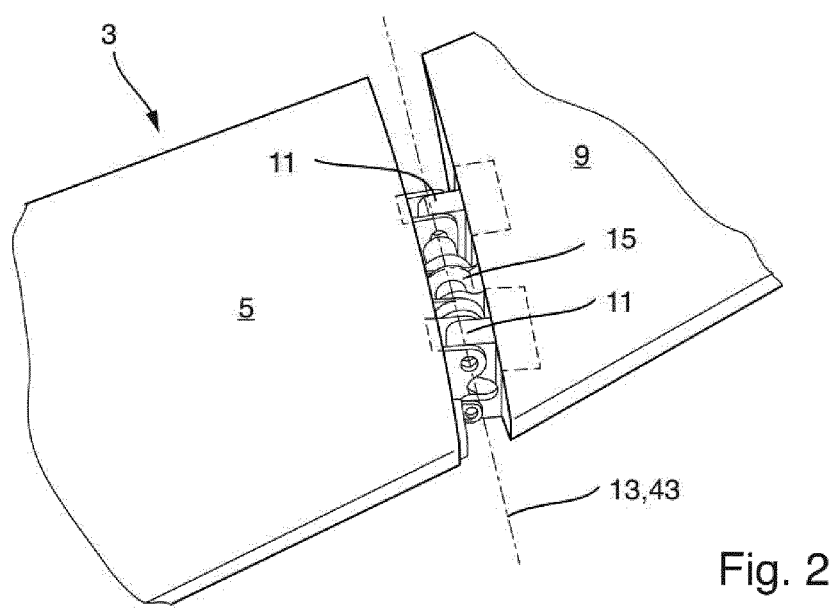

As shown in FIG. 2, the wing 3 comprises a fixed wing 5, a foldable wing tip portion 9 mounted to the fixed wing 5 via hinges 11 rotatably about a hinge axis 13 between an extended position and a folded position, and an actuation unit 15 for actuating movement of the foldable wing tip portion 9 relative to the fixed wing 5, specifically folding upwards of the foldable wing tip portion 9 relative to the fixed wing 5 about the hinge axis 13 that extends in parallel to a chord line and to a flight direction of the aircraft 1.

Figure 3:
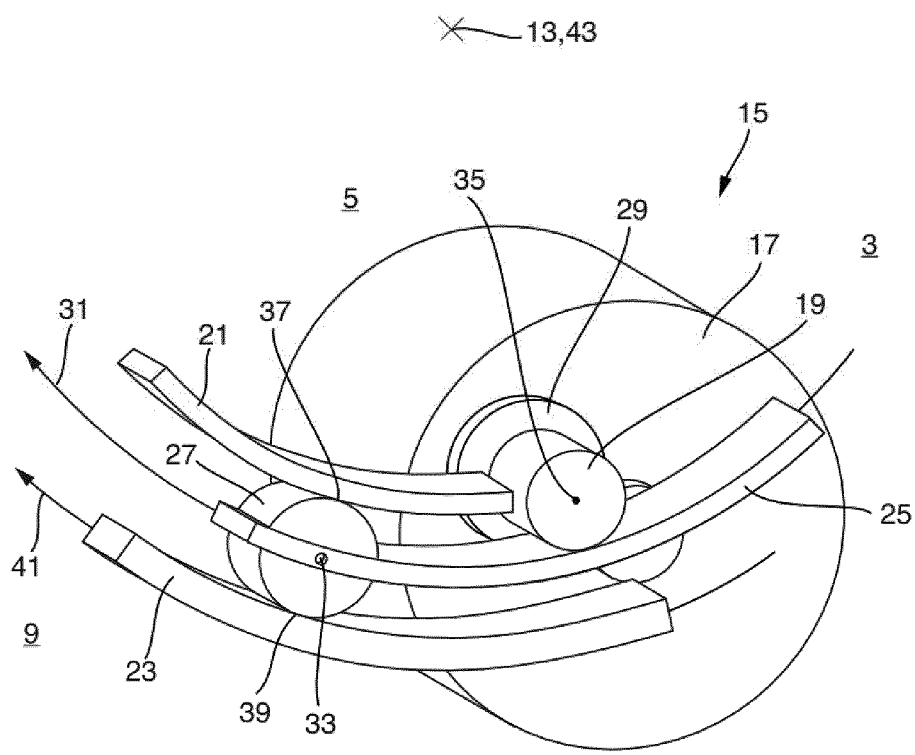
Figure 4:
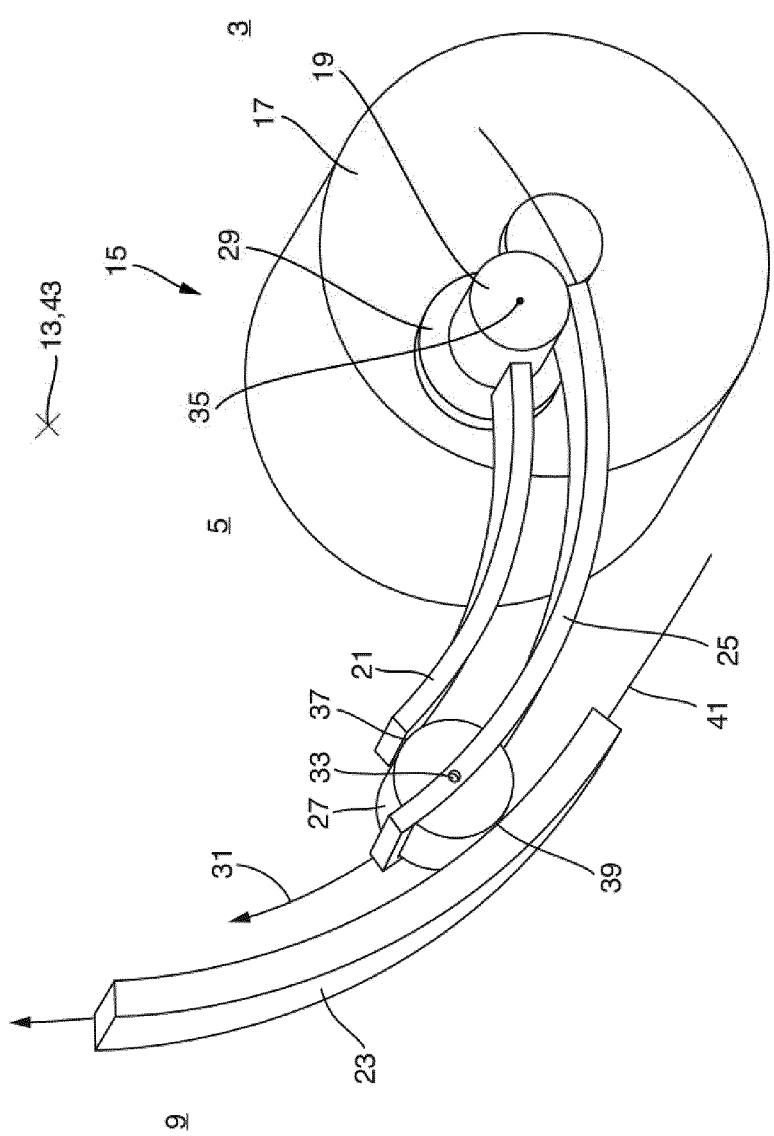

FIGS. 3 and 4 illustrate the actuation unit 15 in further detail. The actuation unit 15 comprising a motor 17, a drive pinion 19, a first rack 21, a second rack 23, a third rack 25, and a transfer pinion 27. The motor 17 is an electric motor or a hydraulic motor and is fixedly mounted to the fixed wing 5. The drive pinion 19 is driven rotationally by the motor 17 via a gear unit 29. The first rack 21 is fixedly mounted to the fixed wing 5. The second rack 23 is fixedly mounted to the foldable wing tip portion 9. The third rack 25 is mounted to the fixed wing 5 movably along a defined first movement path 31 via a roller bearing (not shown), and is drivingly engaged by the drive pinion 19 for being driven along the first movement path 31. The transfer pinion 27 is mounted to the third rack 25 rotatably about an axis of rotation 33 extending perpendicular to the first movement path 31 and parallel to an axis of rotation 35 of the drive pinion 19. The first rack 21 engages the transfer pinion 27 at a first side 37 and the second rack 23 engages the transfer pinion 27 at an opposite second side 39 of the circumference of the transfer pinion 27, so that the second rack is moved by the transfer pinion 27 along a second movement path 41.

The first rack 21, the second rack 23 and the third rack 25 extend equally spaced from one another in a direction perpendicular to their direction of extension with the third rack 25 arranged between the first rack 21 and the second rack 23. The diameter of the transfer pinion 27 is as great as the distance between the first and second racks 21, 23.

The first rack 21, the second rack 23, the third rack 25, the first movement path 31 and the second movement path 41 have a shape circularly curved about a main axis 43 of the actuation unit 15. In such a way, during actuation of the actuation unit 15 the second rack 23 rotates along the second movement path 41 about the main axis 43 and the third rack 25 rotates along first movement path 31 about the main axis 43. Specifically, the first rack 21, the second rack 23, the third rack 25, the first movement path 31 and the second movement path 41 are formed concentrically about the main axis 43 with the first rack 21 having a first curvature radius, the second rack 23 and the second movement path 41 having a second curvature radius, and the third rack 25 and the first movement path 31 having a third curvature radius. The first curvature radius is smaller than the third curvature radius and the third curvature radius is smaller than the second curvature radius.

When the foldable wing tip portion 9 is in the extended position, the second rack 23 extends opposite the first rack 21, as shown in FIG. 3, and when the foldable wing tip portion 9 is in the folded position, the second rack 23 extends offset from the first rack 21, as shown in FIG. 4.

In such a way, a cascaded actuation unit 15 is formed, wherein when the motor 17 driven drive pinion 19 drives the third rack 25 along the first movement path 31, the transfer pinion 27 that is scrolling along the first rack 21 drives the second rack 23 along the second movement path 41 with a speed twice as high as the speed of the third rack 25 driven along the first movement path 31.

The invention claimed is:

1. An actuation unit for actuating a foldable wing tip portion of a wing for an aircraft, the actuation unit, comprising:
a motor configured to be mounted to a fixed wing for an aircraft,
a drive pinion driven rotationally by the motor,
a first rack configured to be mounted to the fixed wing,
a second rack configured to be mounted to the foldable wing tip portion,
a third rack configured to be mounted to the fixed wing movably along a defined first movement path and drivingly engaged by the drive pinion, and
a transfer pinion mounted to the third rack rotatably about an axis of rotation extending perpendicular to the first movement path,
wherein the first rack engages the transfer pinion at a first side and the second rack engages the transfer pinion at an opposite second side of the transfer pinion,
such that, when the drive pinion drives the third rack along the first movement path, the transfer pinion drives the second rack along a second movement path.

2. The actuation unit according to claim 1, wherein the first rack, the second rack and the third rack extend equally spaced from one another with the third rack arranged between the first rack and the second rack.

3. The actuation unit according to claim 1, wherein the first rack, the second rack, the third rack, the first movement path and the second movement path have a shape circularly curved about a main axis.

4. The actuation unit according to claim 1, wherein the first rack, the second rack, the third rack, the first movement path and the second movement path are formed concentrically about the main axis with the first rack having a first curvature radius, the second rack and the second movement path having a second curvature radius, and the third rack and the first movement path having a third curvature radius.

5. The actuation unit according to claim 4, wherein the first curvature radius is smaller than the third curvature radius and the third curvature radius is smaller than the second curvature radius.

6. The actuation unit according to any of claim 1, wherein an axis of rotation of the transfer pinion is parallel to an axis of rotation of the drive pinion.

7. A wing for an aircraft, comprising:
a fixed wing,
a foldable wing tip portion mounted to the fixed wing via a hinge rotatably about a hinge axis between an extended position and a folded position, and
an actuation unit according to claim 1, for actuating the foldable wing tip portion for movement about the hinge axis,
wherein the actuation unit is attached to the fixed wing and to the foldable wing tip portion by the motor being mounted to the fixed wing, the first rack being mounted to the fixed wing, the second rack being mounted to the foldable wing tip portion, and the third rack being mounted to the fixed wing movably along the first movement path,
wherein the hinge axis coincides with the main axis of the actuation unit.

8. The wing according to claim 7, wherein, when the foldable wing tip portion is in the extended position, the second rack extends opposite the first rack, and when the foldable wing tip portion is in the folded position, the second rack extends offset from the first rack.

9. An aircraft, comprising: a wing according to claim 8.

* * * * *